United States Patent
Wesolowska (10) Patent No.: US 9,033,635 B2
(45) Date of Patent: May 19, 2015

(54) FASTENING PIN

(76) Inventor: Malgorzata Wesolowska, Kielce (PL)

( * ) Notice: Subject to any disclaimer, the term of this patent is extended or adjusted under 35 U.S.C. 154(b) by 664 days.

(21) Appl. No.: 10/577,821

(22) PCT Filed: Oct. 29, 2004

(86) PCT No.: PCT/PL2004/000089
§ 371 (c)(1),
(2), (4) Date: Apr. 28, 2006

(87) PCT Pub. No.: WO2005/042986
PCT Pub. Date: May 12, 2005

(65) Prior Publication Data
US 2007/0077133 A1 Apr. 5, 2007

(30) Foreign Application Priority Data

Oct. 30, 2003 (PL) .......................................... 363213
Nov. 9, 2003 (PL) .......................................... 363421
Apr. 16, 2004 (PL) .......................................... 367327

(51) Int. Cl.
*F16B 21/08* (2006.01)
*E04F 19/06* (2006.01)
*F16B 19/00* (2006.01)

(52) U.S. Cl.
CPC .............. *E04F 19/06* (2013.01); *E04F 19/067* (2013.01); *F16B 19/004* (2013.01); *F16B 21/084* (2013.01)

(58) Field of Classification Search
USPC ......... 411/508–510, 913, 456, 537, 538, 452; 52/468; 49/467; 24/297, 453
See application file for complete search history.

(56) References Cited

U.S. PATENT DOCUMENTS

| | | | | |
|---|---|---|---|---|
| 3,483,787 A | * | 12/1969 | Saunders | 411/510 |
| 3,764,729 A | * | 10/1973 | Kowalewski | 174/138 D |
| 3,777,052 A | * | 12/1973 | Fegen | 174/138 D |
| 3,810,279 A | * | 5/1974 | Swick et al. | 411/509 |
| 4,038,801 A | * | 8/1977 | Busch | 52/698 |
| 4,366,603 A | * | 1/1983 | Hulse | 411/510 |
| 4,381,633 A | | 5/1983 | MacLeod et al. | |
| 4,395,174 A | | 7/1983 | Freeman et al. | |
| 4,609,170 A | * | 9/1986 | Schnabl | 248/71 |
| 4,635,325 A | * | 1/1987 | Yagi | 24/453 |
| 4,728,238 A | * | 3/1988 | Chisholm et al. | 411/510 |
| 5,039,267 A | * | 8/1991 | Wollar | 411/508 |
| 5,232,322 A | * | 8/1993 | Regensburger | 411/33 |
| 5,269,640 A | * | 12/1993 | Jonishi et al. | 411/55 |
| 5,306,098 A | | 4/1994 | Lewis et al. | |
| 5,800,109 A | * | 9/1998 | Carruthers | 411/510 |
| 5,907,891 A | | 6/1999 | Meyer et al. | |
| 6,241,747 B1 | * | 6/2001 | Ruff | 606/216 |
| 6,371,710 B1 | * | 4/2002 | Ide et al. | 411/508 |

* cited by examiner

*Primary Examiner* — Flemming Saether
(74) *Attorney, Agent, or Firm* — Horst M. Kasper (57) ABSTRACT

A unitary fastening pin the design of which has flexible protrusions on the lower ⅔ of its shank (2), preferably in the shape of convergent geometrical figures (spade-shaped), molded round the longitudinal axis. The outer overall diameter of the protrusions (2) is greater than the hole into which it is to be inserted. The pin includes a flexing neck (6) between the lower shank and the head (4) and also has tapered alignment splines (16). The pin is particularly suitable for fastening threshold strips to cover floor-covering joints.

1 Claim, 8 Drawing Sheets

FASTENING PIN

TECHNICAL FIELD

The object of the invention is a fixture fastening pin, particularly for attaching fixtures to floors, walls, or similar objects, by insertion into pre-drilled holes. This pin is particularly suitable for fixing threshold cover strips.

BACKGROUND ART

Commonly known and applied pins for fastening into walls mostly consist of two parts, where one part is made mainly with plastic and is expanded in the pre-drilled hole by another insertion usually a metal screw. In many cases such solution is not satisfactory.

Also is known an anchoring pin, e.g. as per the description of the Polish Patent No 176358, with insertion positively locked into a hole by means of bonding mixture which completely fills the clearance between the hole and the pin, being anchored by filling grooves at intervals along the length of the anchoring pin.

From the description of the European Patent No. EP 0588734 is known a threshold strip being in the form of longitudinal profile of a uniform cross-section that includes a keyway to accommodate a nail head of another type of fixing pin. The above mentioned strip may have a curved top surface and the concave underside of its longitudinal surface determines the alignment of the nail in the guide and allows some variability when fastening the threshold strip onto adjoining base surfaces of unequal height.

From U.S. Pat. No. 5,800,109 a fastener comprises head fins and a shaft. The shaft comprises a tapered section and an untapered section.

From U.S. Pat. No. 5,306,098 a one-piece plastic drive fastener comprises an enlarged head with a rigid cylindrical shank extending therefrom and terminating in a free end. Four circumferentially spaced axial rows of wing elements extend generally radially outwardly from the shank. The wing elements each have the shape of a segment of a thin walled truncated cone with a narrow first end joined to the cylindrical shank and a wider second end spaced outwardly of the shank and inclined toward the head portion.

From U.S. Pat. No. 4,381,633, the fastener is of non-corrosive plastic construction having a plurality of angled resiliently-deformable teeth which, when inserted through a hole in the shutter into a mounting hole formed in a building wall, tend to flex in the direction of insertion and tend to return to their original position to resist removal.

From U.S. Pat. No. 4,395,174 a fastener for anchoring a sheet-metal roofing panel to the top horizontal web of a roof-supporting sheet-metal beam, comprises a headed shank having an enlarged tip end constructed to penetrate said roofing panel and the underlying web of the panel's supporting beam, by being either percussively driven or rotatingly bored therethrough.

From U.S. Pat. No. 5,907,891, fastener includes a longitudinal shank of generally H-shaped cross section. The H-shaped cross section is formed of opposed lateral sides and longitudinal cross member. Additionally, opposed lateral sides are spaced by transverse supports. The outer ends of opposed lateral sides respectively, are coextensive with a portion of the circumference of the circular base of conical head.

PURPOSE OF THE INVENTION

The purpose of the present invention is to develop a fastening pin which does not there which does not require the application of mortar or another bonding mixture and avoids, or at least greatly diminishes, the disadvantages known from prior art.

DISCLOSURE OF THE INVENTION

The present invention relates to a fastening pin, which is provided with elastic projections, ideally spade-shaped and which are molded around the longitudinal axis of providing a free overall external diameter greater than the diameter of the pre-drilled hole and thereby being an interference fit producing a self-locking effect.

It is desirable that the spade-shaped projections are arranged at a slightly acute angle to the pin's longitudinal axis, pointing towards its head. Such arrangement of the projections allows the ready insertion of the pin into hole, provides positive self-locking in the pre-drilled hole and at the same time effectively prevents it being easily withdrawn.

The proposed solution is such one in which the projections are flexible and in a shape of narrowly truncated pyramids with rectangular bases (spade-shaped projections). Such projections may have narrow highly flexible outer tips which allow them to come into intimate contact with the walls of the hole.

Also envisaged is a solution in which the spade-shaped projections are arranged radially over a cross-sectional area allowing them to be deflected upwards as the pin is inserted into the hole with varying degrees of force. This solution may also include projections of unequal height and where the different heights of the projections may be produced both around the pin's diameter and along its length. When manufacturing pins with different cross-section cross-sections and lengths it is advantageous that shorter pins should have projections with larger cross-sections and individual width.

In alternate solutions projections may be of different materials than the central pin material and the projections may be in the form of rods, preferably made of steel. There is also the alternative possibility-pin's core to be made from steel made and the projections from plastic.

An integral part of the solution is also the top of the pin, especially when design for threshold strips, when the head is located in a keyway formed in the under surface of the strip, and designed in such a way that the pin has a neck between the anchored part and its head.

Preferably, the neck should have a cross-section with a narrowing or constriction, possibly shaped as a cylindrical, because the narrowing allows the pin to flex at that point. The neck's constriction may also be in the form of an indentation or indentations, preferably positioned symmetrically and at right angles to the pin's longitudinal axis.

The invention also a fastening pin in which the neck has a flat form having an asymmetrical longitudinal axis and having with bends with grooves at their points of maximum curvature to allow the pin flex in a pre-determined place. This provides a springing effect.

Also, envisaged is a pin in which the flexing function is performed by a solution in which the lower section of the pin is made of a material more flexible than the material of which the head is made. The flexible material allows the neck to flex.

In another solution the joint is of a hinge form, in which the pin's head has forked arms between which the top end of the neck, suitably shaped, is attached with a dowel.

An essential feature of the invention is that situated onto ca. ⅔ of pin length from it's end but the pin's part near head is the lower two-thirds, constituting the main shank of the pin has elastic projections, preferably spade-shaped, as described earlier, that are molded around the pin's longitudinal axis.

Ideally these projections should be slightly inclined towards the head of the pin. The upper part of the pin between the main shank and the neck is provided with tapering longitudinal splines symmetrically set around the core of the pin. The taper narrows towards the lower and (main shank) of the pin and provides for positive alignment in the pre-drilled hole. The section immediately above this has a designed constriction to allow the head of the pin to flex and thereby to compensate for any drilling errors or unequal heights in the adjoining finishing layers to be covered by the threshold strip.

The solution proposed in the invention also allows to be firmly located into the vertical surface of a wall without using bonding materials or secondary inserts to make the fitting expand (such as metal screws). The elastic projections, bending in response to small forces, allow the easy insertion of the pin into a hole without using special tools, holding it firmly in place thereby preventing both rotation and easy withdrawal. If a permanent, very high-strength fitting is necessary, the invention does not preclude the use of a setting material to fill the spaces between the projections and the sides of the hole.

The solution provided by the invention provides an easy and highly convenient method for fastening threshold strip onto floor sills of different adjoining heights and also the bridging with similar strips of other parts, however unevenly aligned.

The pin, being fitted with tapered splines, protects the pin's projections from lateral stresses, these being absorbed by the splines positively locating the pin centrally in the hole. The high contact area of the splines with the outward end of the hole as opposed to the minor but multiple contact surfaces of the spade-shaped projections tends to inhibit any chipping of the hole's edges and makes the pin able to resist high shear stresses. The tapering of the splines towards the lower/inner end of the pin permits the easy insertion of the latter the hole and compensates for any drilling inaccuracies which often occur when drilling base material containing inhomogenous particles, such as lumps of aggregate in concrete. By providing the pins with flexing necks it is possible to fasten threshold strips to cover adjoining floor-coverings of uneven height and compensate for any longitudinal unevenness.

BRIEF DESCRIPTION OF THE DRAWINGS

The object of this invention is shown in implementation examples in the enclosed drawings, in which.

BEST MODE FOR CARRYING OUT THE INVENTION

The best mode for carrying out the invention will be presented according to the accompanying set of drawings where the novel shape of the pin will be presented.

A pin (101, 201, 301, 1601) shown in FIGS. 1, 2, 3, and 16 is equipped with flexible projections (102, 202, 302,) that are tapered toward their tips and circumferentially distributed along the longitudinal axis of the shank, especially in the shape of narrowly-tapered truncated pyramids with a rectangular base (spade-shaped projections). The projection axis of the symmetry is situated in the plane of the symmetry of the shank. The projections (102, 202, 302) are situated at an acute angle on the pin's longitudinal axis, inclined slightly towards its head. Individual rows of projections are circumferentially distributed along the pin's longitudinal axis. When inserting the pin into the hole (303, 2103) the projections (102, 202, 302) are deflected upwards.

Figure 1:
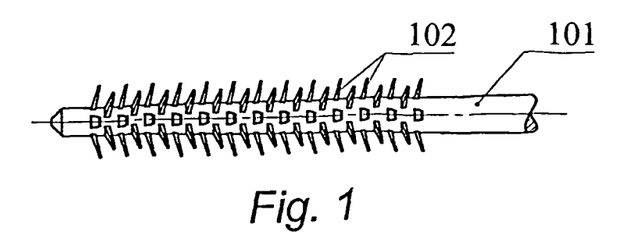
FIG. 1 shows a perspective view of a pin.
Figure 2:
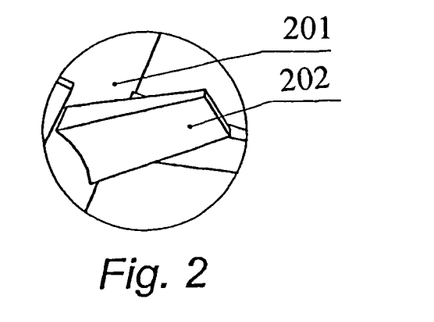
FIG. 2 shows enlarged detail of the pin shown in FIG. 1.
Figure 3:
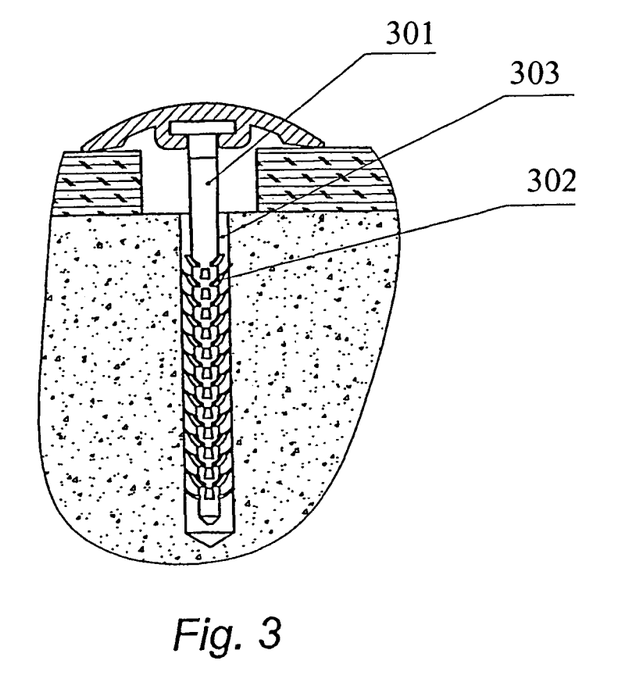
FIG. 3 shows a view of a pin in place in a pre-drilled hole and a fastening strip covering the floor's expansion gap.
Figure 4:
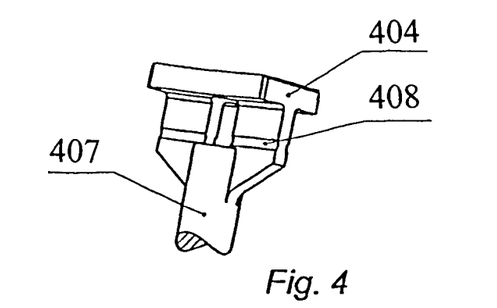
FIG. 4 shows a perspective view of pin with a head having a T' profile.
Figure 5:
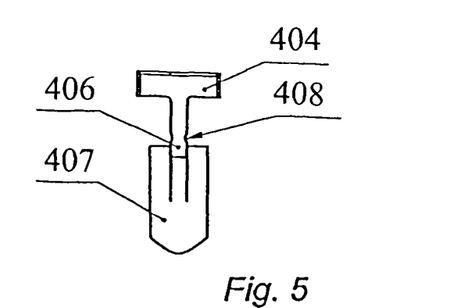
FIG. 5 shows a side elevation view of the pin shown in FIG. 4.

Contact with and pressure against the hole's walls provides a self-locking effect and prevents withdrawal or rotation of the pin. The fastening pin is fitted with a head (404, 604, 804, 1004, 1204, 1404, 1604, 1704) which is located in the threshold strip's underside keyway. The head and neck of the pin may be of various designs as shown in FIGS. 4 and 5, but all are designed to flex or swing in the neck area by means of a thinner section or smaller cross-sectional area at that point.

Figure 22:
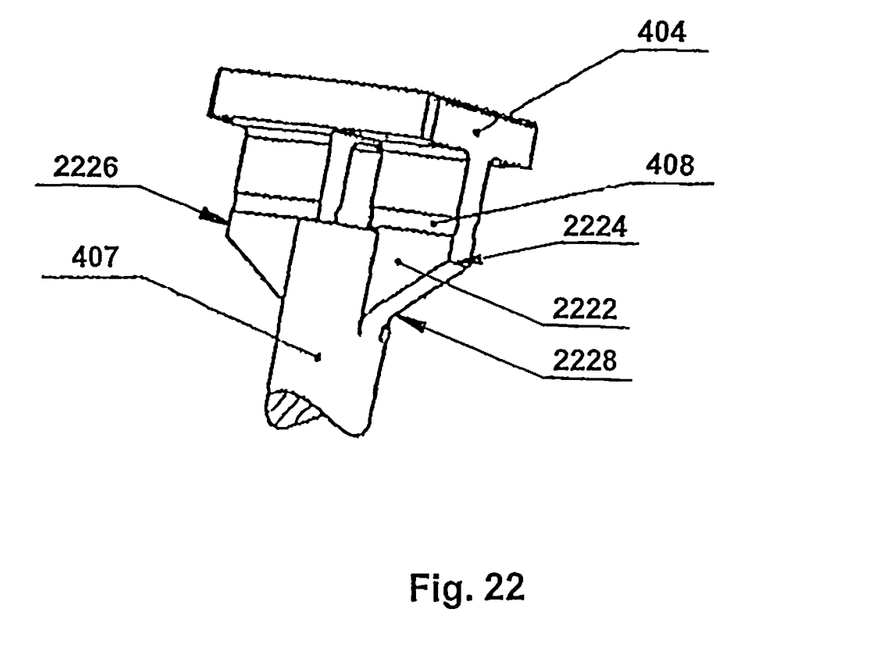
FIG. 22 shows an enlarged view of FIG. 4.
Figure 23:
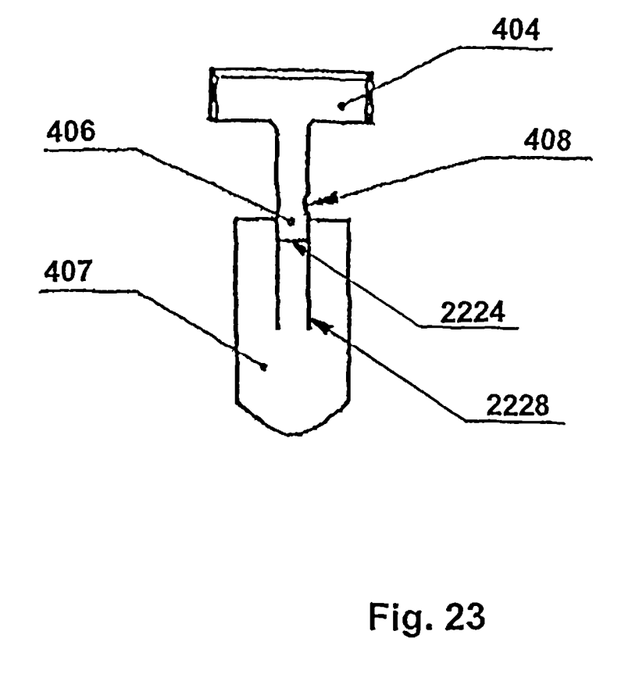
FIG. 23 shows an enlarged view of FIG. 5.

A stabilizing flat, essentially triangular, adapter piece (2222) is disposed symmetrical relative to the symmetry axis of the shank (407). A top of the adapter piece (2222) is formed by a top edge of the adapter piece (2222) extending radial from the symmetry axis of the shank (407). The flexible joint (406, 606, 1406, 1606, 1906) with its bottom end extends vertically and is attached to the top edge of the adapter piece (2222). The flexible joint (406) is formed by a horizontally extending groove (408). The head (404) is formed by a T-shaped section having a bottom end, wherein the bottom end of the T-shaped section extends along and is attached to the top end of the flexible joint (406) and wherein a top plane of the T-section is disposed perpendicular to the symmetry axis of the shank (407).

Figure 24:
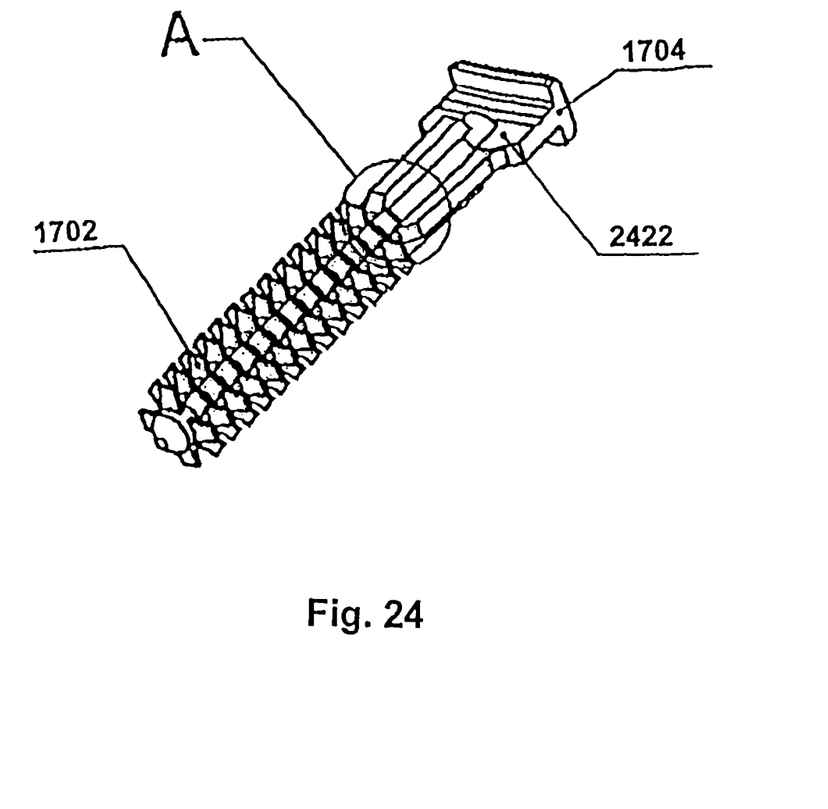
FIG. 24 shows an enlarged view of FIG. 17.

The adapter pieces (2222) and (2226) are stabilizing elements, which connect the head (404) of the shank (407) on which shank projections (102, 202, and 302) are mounted. The function of the projections (102, 202, 302) is stabilizing the shank (407) in the pre-drilled hole (303, 2103). A shape of the adapter piece (2222), with a break or collapse (2224) and (2228), provides a smooth and easy insertion of the shank (407) with projections (102, 202, 302) in the pre-drilled hole (303, 2103). The lower end (2228) of the adapter piece (2222, 2226) fits to the outside of the shank (407). An element (2422) is the same type element as adapter piece (2222).

Figure 6:
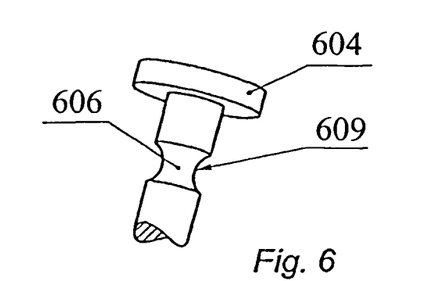
FIG. 6 shows a perspective view of a round-headed pin with a narrowing on a neck.
Figure 7:
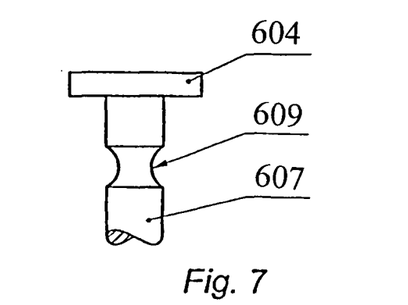
FIG. 7 shows a side elevation view of the pin shown in FIG. 6.

In solution illustrated in FIGS. 6 and 7 the narrowing is in the form of a groove (609) round the whole circumference of the shoulder, and the head (604) is cylindrical. This solution allows the pin to flex on its longitudinal axis.

Figure 8:
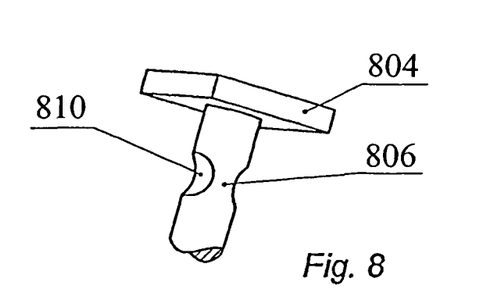
FIG. 8 shows a perspective view of a pin with twin indentations on opposite sides of a neck and a square head.
Figure 9:
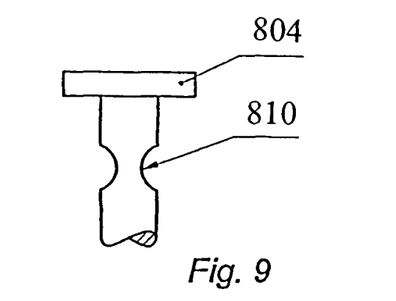
FIG. 9 shows a side elevation view of the pin shown in FIG. 8.

In the design presented in FIGS. 8 and 9 the shoulder has two indentations on opposite sides of the neck. The position of these grooves may lie at any position on the neck relative to the head of the pin.

Figure 10:
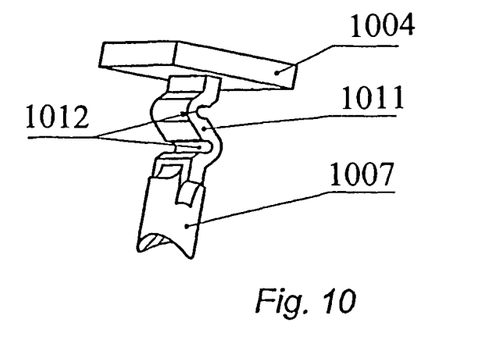
FIG. 10 shows a perspective view of a pin with a square head and a neck in the shape of a double-offset flat bar with a thinner section at each offset.
Figure 11:
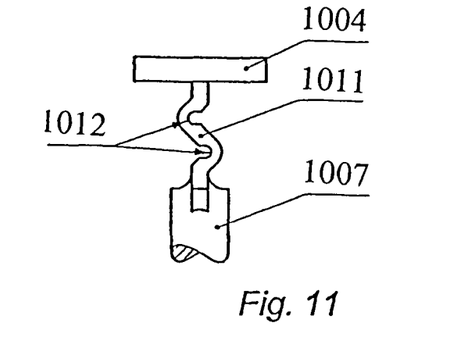
FIG. 11 shows a side view of the pin shown in FIG. 10.

In FIGS. 10 and 11 the pin has a neck in the shape of a double-offset flat bar (1011) with a thinner section (1012) at each offset to allow for a spring effect at this point.

Figure 12:
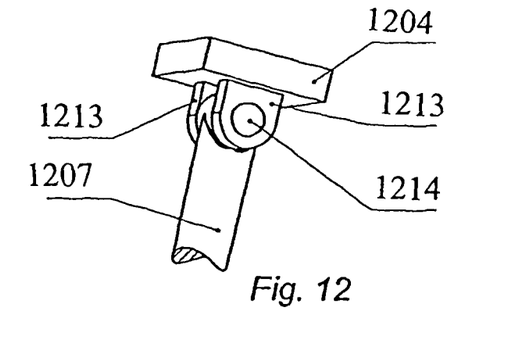
FIG. 12 shows a perspective view of a pin with a hinged head.
Figure 13:
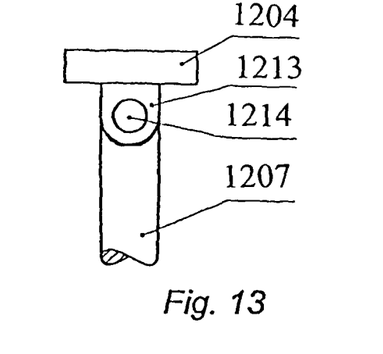
FIG. 13 shows a side elevation view of the pin shown in FIG. 12.

In the solution presented in FIGS. 12 and 13 the joint is in the form of a hinge. Between fork like projections (1213) under the head, the neck has a cross-drilled upper end the two parts being connected by a dowel (1214), allowing the head to move through an arc.

Figure 14:
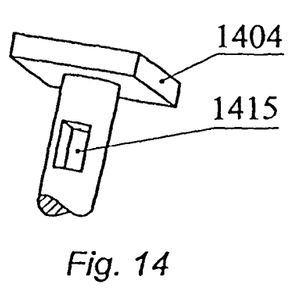
FIG. 14 shows a perspective view of a pin with a transverse rectangular hole across a neck.
Figure 15:
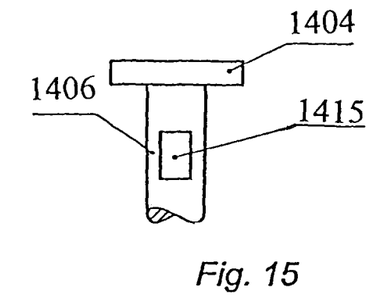
FIG. 15 shows a side elevation view of the pin shown in FIG. 14.
Figure 16:
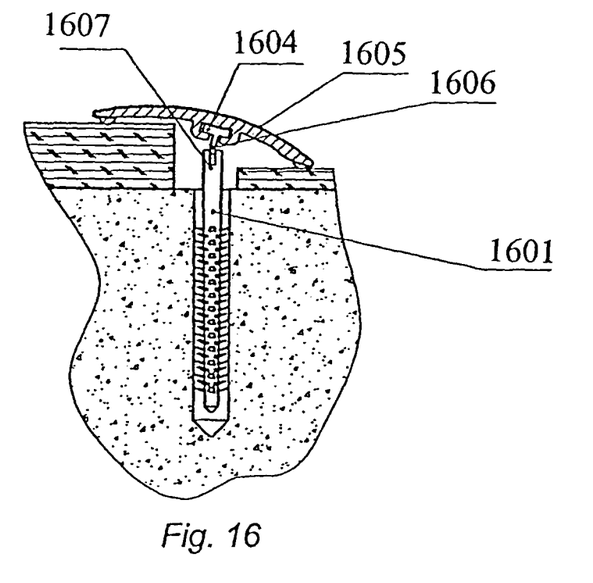
FIG. 16 shows an example of a pin used to fasten a threshold-strip on two adjoining base surfaces of unequal height.

The flexing function is also achieved in the solution presented in FIGS. 14 and 15. A cross-section reduction, allowing the pin to bend at that point is provided by hole (1415) in the neck.

Figure 17:
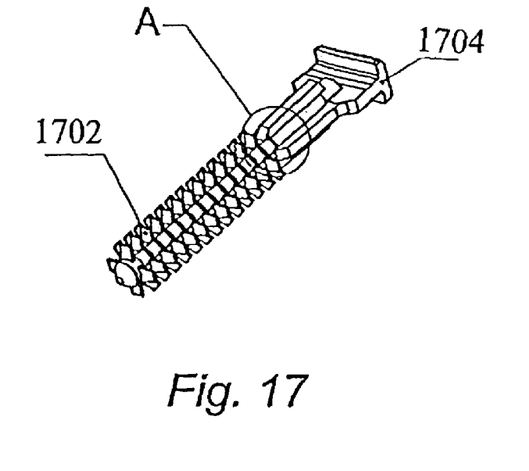
FIG. 17 shows a perspective view of a pin with a head having a T' profile with its various cross sections.
Figure 18:
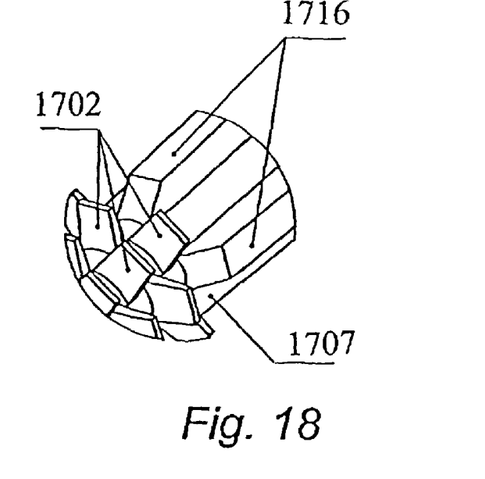
FIG. 18 shows an enlarged detail of the pin shown in FIG. 17.
Figure 19:
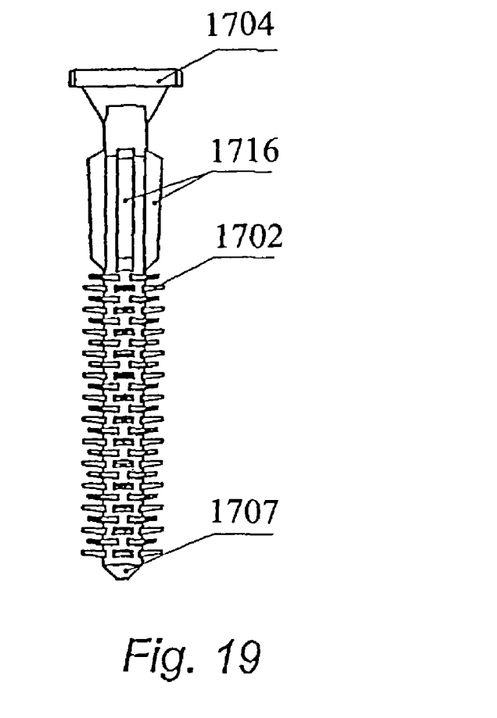
FIG. 19 shows a side elevation view of a pin with a head having a T' profile.
Figure 20:
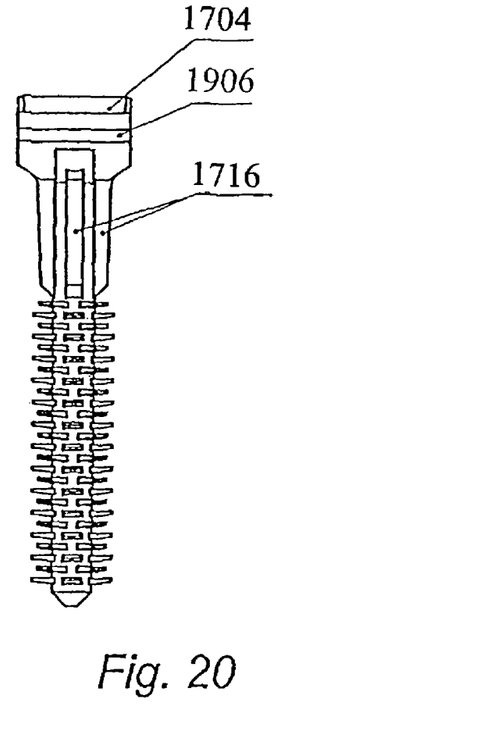
FIG. 20 shows a front elevation view of a pin.

FIG. 17 shows a pin equipped with spade-shaped flexible projections (1702), molded round its longitudinal axis for ca. ⅔ of the lower end of the pin. The part of the pin near the head (1704) contains radially set tapered alignment splines (1716) which have seen side-on have a near-trapezoidal section. These radially set tapered alignment splines are arranged symmetrically round the central body or shank (407, 607, 1007, 1207, 1707, 1607). By being wider towards the head of the pin they permit the upper end of the pin to be aligned centrally in the pre-drilled hole and over-ride any faults caused by the drilling process, such as structural damage to the solid matrix or slight chipping of the edges of the hole.

Figure 21:
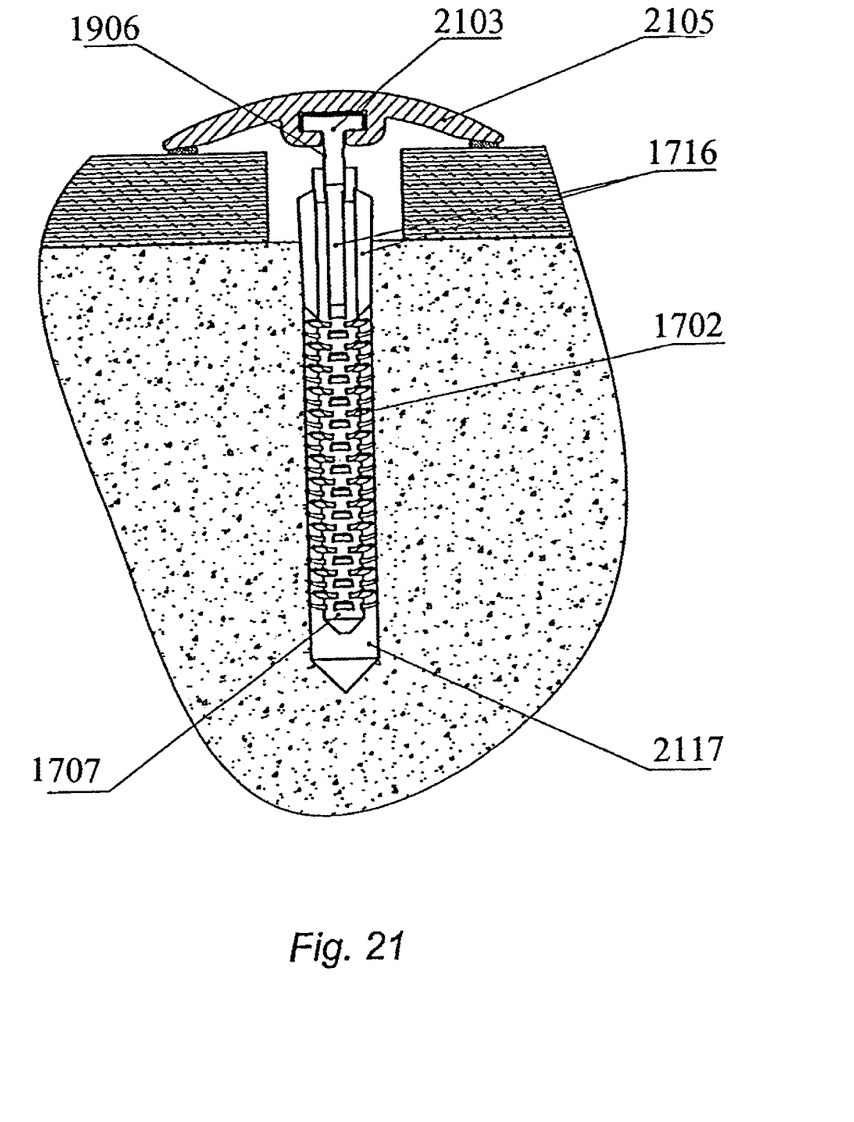
FIG. 21 shows a cross-sectional view of a pin in place in a pre-drilled hole.

FIG. 21 shows a cross-section of a surfaced matrix floor with a typical pin holding a threshold strip (1605, 2105) in place. After pre-drilling holes (2117), the heads of the pins are slid into the keyway on the underside of the threshold strip (1605, 2105).

During such forcing elastic projections (1702) are deflected towards head, and fins stabilize pin's in the hole (2117). The pin has narrowing which accomplish the function of joint and in that way allows deflection of the pin's head when foundation is of different height. The pins may then be slid along the keyway to align with the holes and gently and progressively knocked into place by tapping the top surface of the threshold strip with a soft-headed mallet. Due to the interference fit in the holes the spade-shaped projections will be deflected upwards to provide a self-locking effect. As the pin reaches its final depth the splines engage positively with the upper walls of the hole (2117), providing a positive location. Any misalignment of the row of holes or uneven heights of the adjoining surfaces is compensated by flexing of the neck of the pin at its constriction or in the case of the type of head joint in FIGS. 12, 13 by the head moving physically about the pivot. If the base surface is uneven along the direction of the threshold strip use of the neck type shown in FIGS. 10, 11 will allow the threshold strip itself to be slightly deflected longitudinally, being held in place by the spring-tension in the necks of the pins.

The invention claimed is:

1. A fastening pin for attaching fixtures to floors, or walls, by insertion into a pre-drilled hole, comprising
a head having a bottom end;
a flexible joint having a top end and having a bottom end, wherein the top end of the flexible joint is formed at the bottom end of the head;
a shank having a top end and having a bottom area, wherein the top end of the shank is formed at the bottom end of the flexible joint; and
flexible projections having a first end and having a second end, wherein the first end of the flexible projections is attached to the bottom area of the shank, wherein the second end of the flexible projections extends radial from a symmetry axis of the shank up to beyond a radius of the pre-drilled hole into which the shank and the flexible projections will be inserted and wherein the shank has a bottom area portion with the flexible projections and a top end portion without the flexible projections, wherein the bottom area portion of the shank is homogenously covered with the flexible projections, wherein the flexible projections are tapered towards their second ends, wherein the flexible projections are circumferentially and longitudinally distributed along the longitudinal axis of the shank, starting from the bottom area portion of the shank, and wherein a symmetry axis of the flexible projections intersects with the symmetry axis of the shank and is situated in a respective plane intersected by the symmetry axis of the shank,
a plurality of tapered alignment spline fins radial set around the axis of the shank, which spline fins have a nearly trapezoidal section as seen from a side, wherein the section plane contains the symmetry axis of the shank, wherein the alignment spline fins are arranged symmetrically around the shank in the area of the alignment spline fins and near the head, wherein the alignment spline fins are wider toward the head and thereby allow the upper end of the shank to be aligned centrally in the pre-drilled hole.

* * * * *